United States Patent
Han et al.

(10) Patent No.: US 9,612,886 B2
(45) Date of Patent: Apr. 4, 2017

(54) METHOD AND DEVICE FOR MONITORING API FUNCTION SCHEDULING IN MOBILE TERMINAL

(71) Applicant: TENCENT TECHNOLOGY (SHENZHEN) COMPANY LIMITED, Shenzhen (CN)

(72) Inventors: Jingwei Han, Shenzhen (CN); Lichun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 60 days.

(21) Appl. No.: 14/408,923

(22) PCT Filed: Jun. 17, 2013

(86) PCT No.: PCT/CN2013/077321
§ 371 (c)(1),
(2) Date: Dec. 17, 2014

(87) PCT Pub. No.: WO2013/189263
PCT Pub. Date: Dec. 27, 2013

(65) Prior Publication Data
US 2015/0193280 A1    Jul. 9, 2015

(30) Foreign Application Priority Data
Jun. 18, 2012   (CN) .......................... 2012 1 0200327

(51) Int. Cl.
G06F 9/54    (2006.01)
G06F 11/30   (2006.01)

(52) U.S. Cl.
CPC ............ G06F 9/542 (2013.01); G06F 11/302 (2013.01); G06F 11/3003 (2013.01);
(Continued)

(58) Field of Classification Search
None
See application file for complete search history.

(56) References Cited

U.S. PATENT DOCUMENTS

2007/0234289 A1* 10/2007 Naroff ................... G06F 9/4431
                                                    717/120
2013/0283370 A1* 10/2013 Vipat ...................... G06F 21/44
                                                    726/17
2015/0128156 A1*  5/2015 Zhu .......................... G06F 8/74
                                                    719/328

FOREIGN PATENT DOCUMENTS

CN        101005497 A      7/2007
CN        101478667 A      8/2009
(Continued)

OTHER PUBLICATIONS

International Search Report issued Sep. 26, 2013 re: Application No. PCT/CN2013/077321; citing: CN 101513008 A and CN 101478667 A.

(Continued)

*Primary Examiner* — Umut Onat
(74) *Attorney, Agent, or Firm* — Cantor Colburn LLP

(57) ABSTRACT

Provided in embodiments of the present invention are a method and device for monitoring API function scheduling in a mobile terminal. The method comprises: preconfiguring at least one to-be-monitored API function and a response event corresponding to the at least one to-be-monitored API function; configuring one monitoring processing module on the basis of the at least to-be-monitored API function; acquiring in real-time current listening data outputted by a transmission function listening module; and, when the current listening data satisfies the response event, the monitoring processing module performing a monitoring processing corresponding to the response event.

17 Claims, 2 Drawing Sheets

(52) U.S. Cl.
CPC ...... *G06F 11/3051* (2013.01); *G06F 2201/86* (2013.01); *G06F 2201/865* (2013.01)

(56) References Cited

FOREIGN PATENT DOCUMENTS

| | | |
|---|---|---|
| CN | 101513008 A | 8/2009 |
| CN | 101854624 A | 10/2010 |

OTHER PUBLICATIONS

Chinese Office Action No. CN20120200327.4 Issued Oct. 20, 2015; pp. 6.
International Prelimnary Report and Wrtten Opinion No. PCT/CN2013/077321 dated Dec. 31, 2014; pp. 9.

\* cited by examiner

METHOD AND DEVICE FOR MONITORING API FUNCTION SCHEDULING IN MOBILE TERMINAL

CROSS REFERENCE TO RELATED APPLICATION

This application is the U.S. National Phase application under 35 U.S.C. 371 of International Application No. PCT/CN2013/077321 filed Jun. 17, 2013, which claims the benefit of priority from Chinese Patent Application, No. 201210200327.4, entitled "method and device for monitoring API function scheduling in mobile terminal" and filed by Tencent technology (Shenzhen) company limited on Jun. 18, 2012, the entire contents of which, for each of the aforementioned applications, are hereby incorporated by reference.

TECHNICAL FIELD

The present disclosure relates to computer technologies, and more particularly, to a method and apparatus for monitoring API function invoking.

BACKGROUND

In conventional technologies, applications are developed for mobile terminals based on operating systems of the mobile terminals. The mobile terminal may be a mobile phone or a tablet computer. The application needs to invoke an Application Programming Interface (API) function provide by the operating system so as to implement a specific function. For example, when a certain application needs to check data of an address book stored in a mobile terminal, the application invokes an API function for accessing the address book, so as to check the data of the address book. The API function for accessing the address book is provided by the operating system of the mobile terminal.

Generally, various applications are installed on the mobile terminal to implement various functions or services. However, some applications of the mobile terminal may secretly perform some operations related to data security of a user without informing the user or being authorized by the user. For example, the operation may include reading an address book stored in the mobile terminal, opening pictures stored in the mobile terminal, reading call history of the mobile terminal, which threats data security and user privacy.

Therefore, for the purpose of improving security of the mobile terminal and preventing the application from infringing on user privacy and broking user system, multiple applications currently running on the mobile terminal need to be monitored dynamically and effectively.

Generally, when monitoring the application currently running on the mobile terminal, the API function invoking performed by the application is monitored, e.g. the API function invoked by the application is monitored, so as to check whether the application infringes on user privacy or breaks user system. For example, the API function for reading the address book may be monitored in real time. When a certain application invokes this API function, the action of invoking this API function is obtained, and thus it is known that the application reads the address book stored in the mobile terminal. In this way, various applications running on the mobile terminal are dynamically monitored.

However, in conventional method for monitoring the API function invoking, only one API function is monitored in one monitoring procedure, the monitoring procedure of each API function is independent with each other, and all of the API functions to be monitored cannot be monitored in one monitoring procedure. If multiple API functions need to be monitored, similar monitoring procedures has to be performed for each of the API functions.

In addition, when the conventional method for monitoring the API function invoking is used, the monitoring of the invoked API function is isolated. During a procedure of running a certain application, invoked API functions and a sequence of invoking the API functions cannot be acquired, so that a logic relation between the invoked API functions cannot be analyzed.

SUMMARY

Embodiments of the present disclosure provide a method and apparatus for monitoring API function invoking, so that all of API functions to be monitored are monitored in one monitoring procedure, which is more simple and quick.

The technical solutions of the embodiments of the present disclosure are as follows.

A method for monitoring API function invoking in a mobile terminal includes:

preconfiguring at least one to-be-monitored Application Programming Interface (API) function and a response event corresponding to each of the at least one to-be-monitored API function;

configuring one monitoring module for the at least one to-be-monitored API function;

obtaining current monitoring data output by a sending function monitoring module in real time; and performing, by the monitoring module, monitoring processing corresponding to one response event when the current monitoring data satisfy the response event.

An apparatus for monitoring API function invoking in a mobile terminal includes:

storage and a processor for executing instructions stored in the storage, wherein the instructions comprise:

a configuring instruction, to preconfigure at least one to-be-monitored API function and a response event corresponding to each of the at least one to-be-monitored Application Programming Interface (API) function;

an information obtaining instruction, to obtain current monitoring data of a sending function in real time; and a monitoring instruction, to perform monitoring processing corresponding to the response event when the current monitoring data satisfy the response event.

As can be seen from the above technical solutions, by monitoring the sending function, e.g. the objc_msgSend function, it may be determined whether the application invokes one or more to-be-monitored API functions, so that all of the to-be-monitored API functions are monitored in one monitoring procedure, and it is unnecessary to establish an isolated monitoring procedure for each to-be-monitored API function. Therefore, the monitoring of the API function invoking is more simple and quick. Moreover, in the method for monitoring API function invoking in the mobile terminal, the invoking of multiple API functions may be monitored at the same time, and monitoring data of the objc_msgSend function may be recorded. Therefore, a logic relation between the API functions invoked by a certain application may be obtained by analyzing the recorded monitoring data, and each operation of the application may be tracked and/or analyzed.

DETAILED DESCRIPTION

In order to make the object, technical solution and merits of the present disclosure clearer, the present disclosure will be illustrated in detail hereinafter with reference to the accompanying drawings and specific embodiments.

Figure 1:
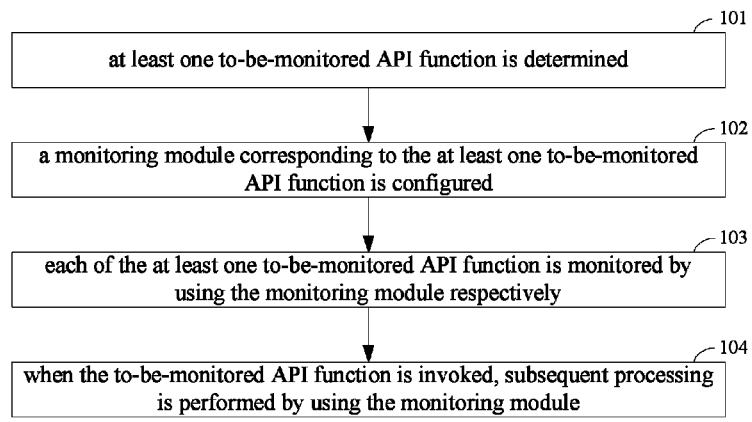
FIG. 1 is a schematic flowchart illustrating a conventional method for monitoring API function invoking in a mobile terminal

FIG. 1 is a schematic flowchart illustrating a conventional method for monitoring API function invoking in a mobile terminal. As shown in FIG. 1, the method includes the following processing.

At 101, at least one to-be-monitored API function is determined.

Different API functions may be invoked by different operations. When an operation needs to be monitored, at least one API function to be invoked by the operation is determined at first and the at least one API function to be invoked is configured as to-be-monitored API function.

At 102, a monitoring module corresponding to the at least one to-be-monitored API function is configured.

In this step, the monitoring module is configured for the at least one to-be-monitored API function. The monitoring module is used to monitor invoking of the at least one to-be-monitored API function and perform subsequent processing.

At 103, each of the at least one to-be-monitored API function is monitored by using the monitoring module respectively.

At 104, when the to-be-monitored API function is invoked, subsequent processing is performed by using the monitoring module.

In this step, the subsequent processing includes at least one of: sending reminding information or inquiring information to a user, recording information of an application invoking the to-be-monitored API function, and interrupting the application invoking the to-be-monitored API function.

Figure 2:
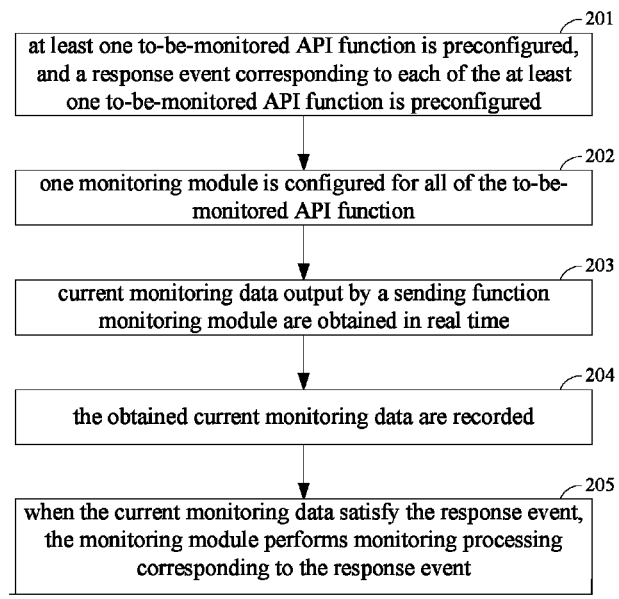
FIG. 2 is a schematic diagram illustrating a method for monitoring API function invoking in a mobile terminal according to various embodiments of the present disclosure.

FIG. 2 is a schematic diagram illustrating a method for monitoring API function invoking in a mobile terminal according to various embodiments of the present disclosure. As shown in FIG. 2, the method includes the following processing.

At 201, at least one to-be-monitored API function is preconfigured, and a response event corresponding to each of the at least one to-be-monitored API function is preconfigured.

In this step, the at least one to-be-monitored API function may be determined by using a preconfigured mode in advance, and then the response event corresponding to each of the at least one to-be-monitored API function is configured.

In an embodiment of the present disclosure, the to-be-monitored API function may be one of: a function for removing a contact from an address book, e.g. an ABAddressBookRemoveRecord function; a function for accessing a network, e.g. a setURL method of a NSMutableURLRequest class; a function for obtaining a list of installed applications, e.g. a MobileInstallationBrowse function; a function for sending a short message; a function for reading contact information; a function for starting an application; a function for accessing a file; and a function for making a phone call.

In an embodiment of the present disclosure, the response event corresponding to the to-be-monitored API function may be preconfigured according to practical requirements. The response event may be that at least one application running on the mobile terminal invokes at least one to-be-monitored API function.

For example, when the to-be-monitored API function is the function for accessing the network, the response event corresponding to the function for accessing the network may be configured as that any one or multiple applications running on the mobile terminal invokes the function for accessing the network, e.g. the setURL method of the NSMutableURLRequest class. When the to-be-monitored API function is the function for obtaining the list of installed applications, the response event corresponding to the function for obtaining the list of installed applications may be configured as that any one or multiple application running on the mobile terminal invokes the MobileInstallationBrowse function to obtain a list of installed applications.

At 202, one monitoring module is configured for all of the to-be-monitored API function.

At 201, multiple to-be-monitored API functions may be preconfigured. In this step, only one monitoring module is configured for all of the to-be-monitored API functions to perform subsequent monitoring processing. The subsequent monitoring processing includes at least one of: recording information of an application invoking the to-be-monitored API function, interrupting the application invoking the to-be-monitored API function, sending reminding information or inquiring information to a user, and performing processing according to an instruction of a user or a preconfigured operation. For example, the preconfigured operation may be allowing or stopping the running of the application.

At 203, current monitoring data output by a sending function monitoring module are obtained in real time.

Generally, various applications running on the mobile terminal are edited by using a specific program language corresponding to the mobile terminal. For example, on a mobile terminal produced by APPLE Inc., e.g. on an IPHONE, or an IPAD, the applications are edited by using an objective_c language. The objective_c language is one of object-oriented languages. There is no object invoking method in the objective_c language, and each function is implemented by sending a message to each object method. All of the operations of sending messages to the object methods are implemented by using an object message sending (objc_msgSend) function. Therefore, by monitoring the objc_msgSend function, the invoking of each API function is monitored, so that one or multiple API functions are monitored at the same time.

According to the embodiments of the present disclosure, when the applications of the mobile terminal are edited by using other object-oriented languages and each function is implemented by sending a message to each object method, a sending function of a bottom layer may be monitored to obtain the operation of sending message to each object method.

In the embodiment, the sending function is the objc_msgSend function, and the sending function monitoring module is a module for monitoring the objc_msgSend function.

The module for monitoring the objc_msgSend function may be preconfigured to monitor each sending operation of the objc_msgSend function in real time and output the current monitoring data. The current monitoring data may include an object method corresponding to each sending operation of the objc_msgSend function. According to the current monitoring data, the object method and the message sending to the object method by the objc_msgSend function are obtained. In embodiments of the present disclosure, the module for monitoring the objc_msgSend function may be a conventional module for monitoring the objc_msgSend function which is not described in detail herein.

In this step, after the module for monitoring the objc_msgSend function is configured, the current monitoring data may be obtained from the module for monitoring the objc_msgSend function in real time.

At 204, the obtained current monitoring data are recorded.

In this step, after the current monitoring data are obtained from the module for monitoring the objc_msgSend function, the current monitoring data are recorded to be analyzed, so as to obtain a logic relation between API functions invoked by a certain application, and further to track and/or analyze various operations of the certain application.

In embodiments of the present disclosure, the processing at 204 and the processing at 205 may be performed together or performed according to a preconfigured sequence. For example, the processing at 204 may be performed before the processing at 205.

In addition, if it is unnecessary to analyze the logic relation between the API functions invoked by the certain application, the processing at 204 may be omitted.

At 205, when the current monitoring data satisfy the response event, the monitoring module performs monitoring processing corresponding to the response event.

In this step, based on the current monitoring data, it is determined whether the current monitoring data satisfy the response event. For example, based on the current monitoring data, it is determined whether at least one application running on the mobile terminal invokes the at least one to-be-monitored API function. If at least one application running on the mobile terminal invokes the at least one to-be-monitored API function, it is indicated that the current monitoring data satisfy the response event, and the monitoring module performs the monitoring processing corresponding to the response event.

In an embodiment, the subsequent monitoring processing at 205 includes at least one of: recording information of an application invoking the to-be-monitored API function, interrupting an application invoking the to-be-monitored API function, sending reminding information or inquiring information to a user, and performing processing according to an instruction of a user or a preconfigured operation. For example, the preconfigured operation may be allowing the application to run on the mobile terminal or stopping the application running on the mobile terminal.

According to the above descriptions, by monitoring the sending function, e.g. the objc_msgSend function, it is determined whether the application invokes one or more to-be-monitored API functions, so that all of the to-be-monitored API functions are monitored in one monitor procedure, which is more simple and quick. Further, in the above method for monitoring the API function invoking, multiple API functions may be monitored at the same time, and the monitoring data of the objc_msgSend function may be recorded to be analyzed, so as to obtain the logic relation between the API functions invoked by a certain application, and further to track and/or analyze various operations of the certain application.

According to the above-mentioned method, the embodiments of the present disclosure also provide an apparatus for monitoring API function invoking.

Figure 3:
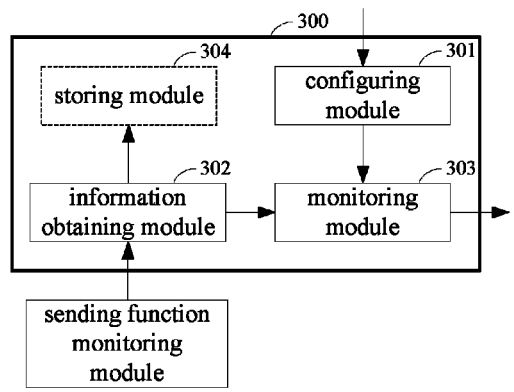
FIG. 3 is a schematic flowchart illustrating an apparatus for monitoring API function invoking in a mobile terminal according to various embodiments of the present disclosure.

FIG. 3 is a schematic flowchart illustrating an apparatus for monitoring API function invoking in a mobile terminal according to various embodiments of the present disclosure. As shown in FIG. 3, the apparatus 300 includes a configuring module 301, an information obtaining module 302, and a monitoring module 303.

The configuring module 301 is to preconfigure at least one to-be-monitored API function and a response event corresponding to each of the at least one to-be-monitored API function, send the at least one to-be-monitored API function and the at least one response event to the monitoring module 303.

The information obtaining module 302 is to obtain current monitoring data of a sending function monitoring module in real time, and send the current monitoring data to the monitoring module 303. The sending function monitoring module may be a module for monitoring an objc_msgSend function.

The monitoring module 303 is to perform monitoring processing corresponding to the response event, when the current monitoring data satisfy the response event.

In an embodiment, the apparatus 300 for monitoring the API function invoking in the mobile terminal may further comprises a storing module 304. The storing module 304 is to record the obtained current monitoring data.

Figure 4:
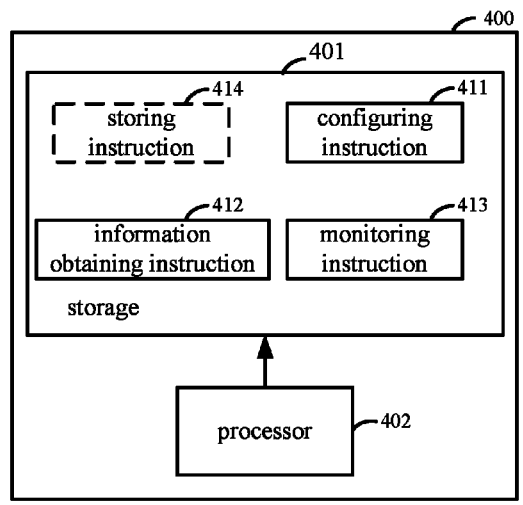
FIG. 4 is a schematic flowchart illustrating an apparatus for monitoring API function invoking in a mobile terminal according to various embodiments of the present disclosure.

FIG. 4 is a schematic flowchart illustrating an apparatus for monitoring API function invoking in a mobile terminal according to various embodiments of the present disclosure. As shown in FIG. 4, the apparatus 400 includes storage 401 and a processor 402. The processor may communicate with the storage 401. The storage 401 includes instructions which may be performed by the processor 402. The instructions include a configuring instruction 411, an information obtaining instruction 412 and a monitoring instruction 413.

The configuring instruction 411 is to preconfigure at least one to-be-monitored API function and a response event corresponding to each of the at least one to-be-monitored API function.

The information obtaining instruction 412 is to obtain current monitoring data of a sending function in real time. The sending function may be an objc_msgSend function.

The monitoring instruction 413 is to perform monitoring processing corresponding to the response event, when the current monitoring data satisfy the response event.

In an embodiment, the storage further stores a storing instruction 414 to record the obtained current monitoring data.

According to the above descriptions, by monitoring the sending function, e.g. the objc_msgSend function, it is determined whether the application invokes one or more to-be-monitored API function, so that all of the to-be-monitored API functions are monitored in one monitor procedure, which is more simple and quick. Further, in the above method for monitoring the API function invoking, multiple API functions may be monitored at the same time, and the monitoring data of the objc_msgSend function are recorded to be analyzed, so as to obtain a logic relation between API functions invoked by a certain application, and further to track and/or analyze various operations of the certain application.

The foregoing is only preferred embodiments of the present disclosure and is not used to limit the protection scope of the present disclosure. Any modification, equivalent substitution and improvement without departing from the principle of the present disclosure are within the protection scope of the present disclosure.

The invention claimed is:

1. A method for monitoring API function invoking in a mobile terminal, comprising:
   preconfiguring at least one to-be-monitored Application Programming Interface (API) function and a response event corresponding to each of the at least one to-be-monitored API function;
   configuring one monitoring module for the at least one to-be-monitored API function;
   obtaining current monitoring data output by a sending function monitoring module in real time; and
   performing, by the monitoring module, monitoring processing corresponding to one response event in response to determining that the current monitoring data satisfy the response event;
   wherein the sending function monitoring module comprises a module for monitoring an object message sending (objc_msgSend) function; and
   obtaining the current monitoring data output by the sending function monitoring module in real time comprises:
   obtaining an object method corresponding to each sending operation of the object message sending function in real time.

2. The method of claim 1, further comprising:
   recording the current monitoring data.

3. The method of claim 1, wherein the to-be-monitored API function comprises at least one of:
   a function for removing a contact from an address book, a function for accessing a network, a function for obtaining a list of installed applications, a function for sending a short message; a function for reading contact information; a function for starting an application; a function for accessing a file; and a function for making a phone call.

4. The method of claim 1, wherein the response event comprises:
   at least one to-be-monitored API function being invoked by at least one application running on the mobile terminal.

5. The method of claim 1, wherein the monitoring processing comprises at least one of:
   recording information of an application invoking the to-be-monitored API function;
   interrupting an application invoking the to-be-monitored API function;
   sending reminding information or inquiring information to a user; and
   performing processing according to an instruction of a user or a preconfigured operation.

6. The method of claim 1, wherein preconfiguring the at least one to-be-monitored API function and the response event corresponding to each of the at least one to-be-monitored API function comprises:
   configuring a function for accessing a network as a to-be-monitored API function; and
   configuring a response event corresponding to the function for accessing the network as that any one of or multiple applications running on the mobile terminal invokes the function for accessing the network.

7. The method of claim 1, wherein preconfiguring the at least one to-be-monitored API function and the response event corresponding to each of the at least one to-be-monitored API function comprises:
   configuring a function for obtaining a list of installed applications as a to-be-monitored API function; and
   configuring a response event corresponding to the function for obtaining the list of installed applications as that any one of or multiple applications running on the mobile terminal invokes the function for obtaining the list of installed applications.

8. The method of claim 6, wherein the function for accessing the network is a setURL method of a NSMutableURLRequest class.

9. The method of claim 7, wherein the function for obtaining the list of installed applications is a MobileInstallationBrowse function.

10. The method of claim 1, wherein before performing, by the monitoring module, monitoring processing corresponding to the one response event in response to determining that the current monitoring data satisfy the response event, the method further comprises:
    recording and analyzing the current monitoring data output by the sending function monitoring module to obtain a logic relation between API functions invoked by an application; and
    tracking and analyzing operations of the application based on the obtained logic relation.

11. An apparatus for monitoring API function invoking in a mobile terminal, comprising: a non-transitory storage storing computer executable instructions, and a processor for executing computer executable instructions stored in the storage, wherein the computer executable instructions comprise:
    a set of configuring instructions, to preconfigure at least one to-be-monitored API function and a response event corresponding to each of the at least one to-be-monitored Application Programming Interface (API) function;
    a set of information obtaining instructions, to obtain current monitoring data of a sending function in real time; and
    a set of monitoring instructions, to perform monitoring processing corresponding to the response event when the current monitoring data satisfy the response event;
    wherein the sending function comprises an object message sending (objc_msgSend) function; and
    obtaining the current monitoring data of the sending function in real time comprises:
    obtaining an object method corresponding to each sending operation of the object message sending function in real time.

12. The apparatus of claim 8, wherein the computer executable instructions further comprise:
    a set of storing instructions, to record the current monitoring data.

13. The apparatus of claim 11, wherein the set of configuring instructions comprise computer executable instructions to:
    configure a function for accessing a network as a to-be-monitored API function; and
    configure a response event corresponding to the function for accessing the network as that any one of or multiple applications running on the mobile terminal invokes the function for accessing the network.

14. The apparatus of claim 11, wherein the set of configuring instructions comprise computer executable instructions to:
    configure a function for obtaining a list of installed applications as a to-be-monitored API function; and
    configure a response event corresponding to the function for obtaining the list of installed applications as that any one of or multiple applications running on the mobile terminal invokes the function for obtaining the list of installed applications.

15. The apparatus of claim 13, wherein the function for accessing the network is a setURL method of a NSMutableURLRequest class.

16. The apparatus of claim 14, wherein the function for obtaining the list of installed applications is a MobileInstallationBrowse function.

17. The apparatus of claim 11, wherein the computer executable instructions perform:
   recording and analyzing the current monitoring data of the sending function to obtain a logic relation between API functions invoked by an application; and
   tracking and analyzing operations of the application based on the obtained logic relation.

* * * * *